US008931825B2

(12) United States Patent
Oota

(10) Patent No.: US 8,931,825 B2
(45) Date of Patent: Jan. 13, 2015

(54) VEHICLE FRONT STRUCTURE

(71) Applicant: Fuji Jukogyo Kabushiki Kaisha, Tokyo (JP)

(72) Inventor: Kazuhiro Oota, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/945,503

(22) Filed: Jul. 18, 2013

(65) Prior Publication Data

US 2014/0028051 A1    Jan. 30, 2014

(30) Foreign Application Priority Data

Jul. 27, 2012  (JP) .................................. 2012-166892

(51) Int. Cl.
*B60R 21/00*  (2006.01)
*B60R 21/34*  (2011.01)
*B60R 19/12*  (2006.01)
*B60R 19/18*  (2006.01)

(52) U.S. Cl.
CPC ................. *B60R 21/34* (2013.01); *B60R 19/12* (2013.01); *B60R 2019/1886* (2013.01)
USPC ................................. 296/187.04; 296/187.09

(58) Field of Classification Search
CPC .............. B60R 2019/1886; B60R 2019/1806; B60R 19/02; B60R 19/205; B60R 19/24; B60R 2021/0407; B60R 21/04; B62D 21/15
USPC ............... 296/187.04, 1.04; 293/121, 24, 109
See application file for complete search history.

(56) References Cited

U.S. PATENT DOCUMENTS 6,540,275 B1 *  4/2003  Iwamoto et al. ................ 293/24
7,597,383 B2  10/2009  Itou et al.

FOREIGN PATENT DOCUMENTS

| JP | 2006-273212 | 10/2006 |
|---|---|---|
| JP | 2007-091006 | 4/2007 |
| JP | 2007-112256 | 5/2007 |
| JP | 2008-137591 | 6/2008 |
| JP | 2008-265399 | 11/2008 |
| JP | 2008-265399 A | 11/2008 |

* cited by examiner

*Primary Examiner* — Joseph D Pape
*Assistant Examiner* — Dana Ivey
(74) *Attorney, Agent, or Firm* — Smith, Gambrell & Russell LLP

(57) ABSTRACT

A vehicle front structure includes: an exterior member provided at a lower portion of a front end of a vehicle; and an energy absorbing bracket having front and rear ends, the front end facing a rear surface of the exterior member and the rear end being mounted on a vehicle structural member. The energy absorbing bracket has an upper surface which is disposed to be inclined downward toward a front of the vehicle, and the inclination increases continuously or stepwise from a rear of the vehicle to the front of the vehicle, lower vehicle width direction ribs which project downward from the upper surface, extend substantially in a vehicle width direction, and are disposed in a vehicle front-rear direction, and lower vehicle front-rear direction ribs which project downward from the upper surface, extend substantially in the vehicle front-rear direction, and disposed in the vehicle width direction.

17 Claims, 5 Drawing Sheets

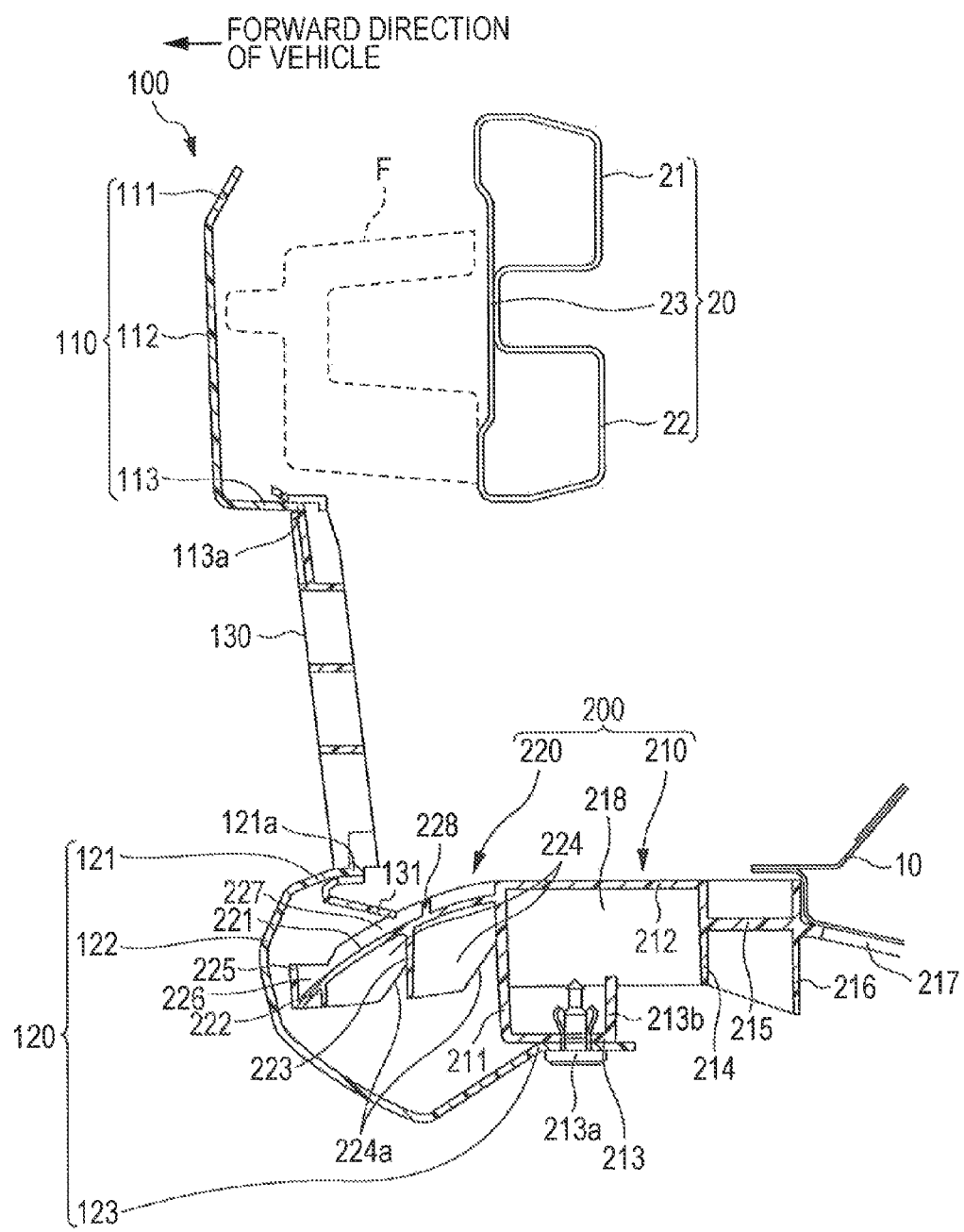

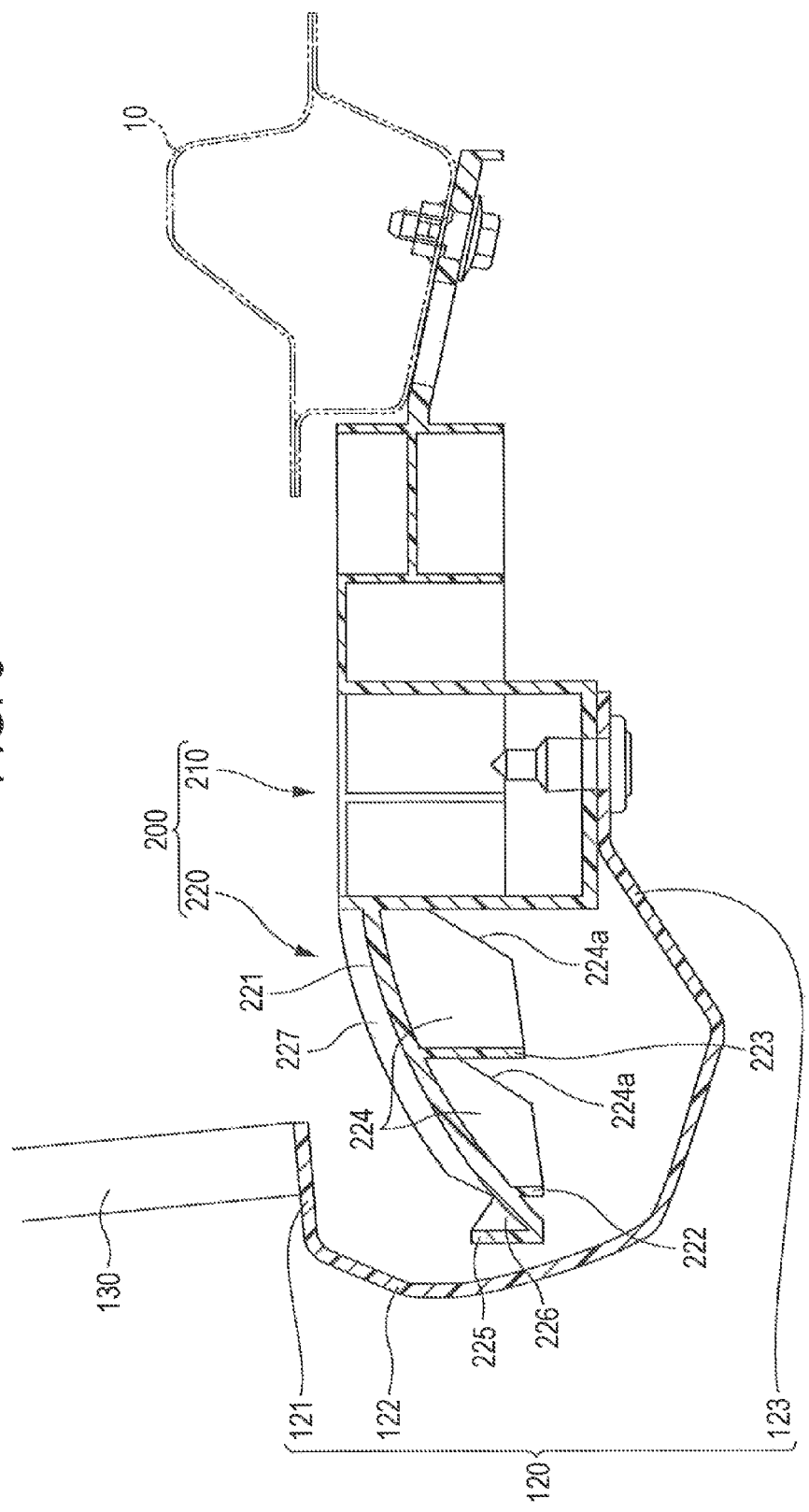

VEHICLE FRONT STRUCTURE

CROSS-REFERENCE TO RELATED APPLICATIONS

The present application claims priority from Japanese Patent Application No. 2012-166892 filed on Jul. 27, 2012, the entire contents of which are hereby incorporated by reference.

BACKGROUND OF THE INVENTION

1. Field of the Invention

The present invention relates to a front structure of a vehicle such as an automobile, and particularly to a front structure which, when colliding with a leg of a pedestrian, can receive a load at a position lower than the end position of an energy absorbing bracket before the collision.

2. Description of the Related Art

A bumper provided at the front end of a vehicle includes a bumper face and an energy absorbing (EA) member which has an energy absorbing effect, and is configured to receive a compressive load internally from a bumper face in a collision with a pedestrian and to transmit the compressive load to the main body of the vehicle. The bumper face is part of the exterior of the vehicle and a design component.

The related art of such a bumper structure for vehicles includes, for example, Japanese Unexamined Patent Application Publication No. 2008-265399 which describes that an energy absorbing bracket is disposed inside of a lower portion (air dam) of a bumper face, the energy absorbing bracket in which a plurality of front-rear direction ribs and vehicle width direction ribs are suspended downward from a horizontally disposed upper surface.

It is known at a collision with a pedestrian's leg, an impact to the knees of the pedestrian and the degree of damage to the pedestrian can be reduced by lowering the height of a position at which a collision load is received by the pedestrian and allowing the pedestrian's leg to be hit upward. However, the height of the air dam provided at the lower end of the bumper face may not necessarily be adjusted to a height suitable for protecting the pedestrian's leg because of restrictions on the height of the vehicle from the ground and vehicle design, and thus a vehicle front structure capable of receiving a load at a lower position has been demanded.

SUMMARY OF THE INVENTION

In view of the above described problem, it is an object of the present invention to provide a vehicle front structure which, when colliding with a pedestrian's leg, can receive a load at a position lower than the end position of an energy absorbing bracket before the collision.

An aspect of the present invention provides a vehicle front structure including: an exterior member which is provided at a lower portion of a front end of a vehicle; and an energy absorbing bracket having a front end and a rear end, the front end facing a rear surface of the exterior member and the rear end being mounted on a vehicle structural member. The energy absorbing bracket has an upper surface which is disposed so as to be inclined downward toward a front side of the vehicle, and the inclination increases continuously or stepwise from a rear side of the vehicle to the front side of the vehicle, a lower vehicle width direction rib which is formed so as to project downward from the upper surface and extends substantially in a vehicle width direction, and a lower vehicle front-rear direction rib which is formed so as to project downward from the upper surface and extends substantially in a vehicle front-rear direction.

Preferably, the vehicle front structure further includes an upper vehicle front-rear direction rib which projects upward from the upper surface and extends substantially in the vehicle fore-and-aft direction.

Preferably, the vehicle front structure further includes: an engaging projection which projects from the exterior member toward the energy absorbing bracket; and an engaged portion which is formed so as to project from the upper surface of the energy absorbing bracket, and which is disposed to face a projecting tip of the engaging projection.

Preferably, the vehicle front structure further includes a projecting surface which is formed so as to project upward from a front end of the upper surface.

Preferably, a gusset-shaped reinforcing member is formed between a rear surface of the projecting surface and the upper surface.

Preferably, a flexural rigidity against a load applied in a vertical direction in an area located rearward of another area in which the upper surface of the energy absorbing bracket is inclined is set to be higher than a flexural rigidity in the another area.

Preferably, the lower vehicle front-rear direction rib has a notch which is formed by denting up a lower end of the lower vehicle front-rear direction rib.

BRIEF DESCRIPTION OF THE DRAWINGS

FIG. 1 is a cross-sectional view of a vehicle front structure according to Embodiment 1 in the present invention, the view being taken at the center in a vehicle width direction;

FIG. 6 is a cross-sectional view of a vehicle front structure according to Embodiment 2 in the present invention, the view being taken at the center in a vehicle width direction.

DESCRIPTION OF THE PREFERRED EMBODIMENTS

Figure 2A:
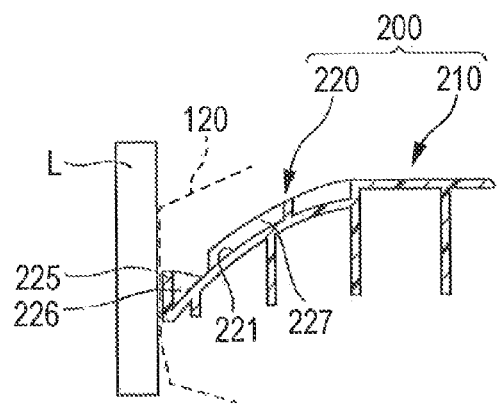
FIGS. 2A to 2C are time series schematic diagrams illustrating the behavior of the vehicle front structure in Embodiment 1 when a collision occurs.

It is an object of the present invention to provide a vehicle front structure which, when colliding with a leg of a pedestrian, is capable of receiving a load at a position lower than the end position of an energy absorbing bracket before the collision. Specifically, the vehicle front structure has an upper surface of the front portion of EA bracket, the upper surface having an arc-shaped cross section with an upward convex as viewed in the vehicle width direction, and the end portion of the EA bracket being disposed lower than the rear end portion of the EA bracket, thereby stably providing a deformation mode in which the end portion is displaced downward when a collision occurs.

Embodiment 1

Hereafter, a vehicle front structure according to Embodiment 1 in the present invention will be described. The vehicle front structure according to Embodiment 1 is mounted on, for example, an automobile such as a passenger car. FIG. 1 is a cross-sectional view of the vehicle front structure according to Embodiment 1, the view being taken at the center in a vehicle width direction. The vehicle front structure includes a radiator panel lower 10, a bumper beam 20, a bumper face 100, and an energy absorbing (EA) bracket 200.

The radiator panel lower 10 is a beam-like member which is provided at a lower portion of the front of a vehicle, and extends substantially in a vehicle width direction. The radiator panel lower 10 supports the lower ends of a radiator core and a capacitor of an air conditioner which are not illustrated. The radiator panel lower 10 is formed by assembling, for example, a plurality of press-molded panels and spot welding the panels, and thus has a closed cross-section and is formed rigid relative to the bumper face 100 and the EA bracket 200. The radiator panel lower 10 is a vehicle structural member that forms part of a white body (vehicle body before assembly).

The bumper beam 20 is a beam-like member which is provided at the front of the front side frame of a vehicle body (not illustrated), and extends substantially in the vehicle width direction. The bumper beam 20 is disposed at a position which is higher than and projects forwardly of the radiator panel lower 10. The bumper beam 20 is a member which receives a load from an object and transmits the load toward the rear of the vehicle when a collision occurs with the object. The bumper beam 20 is formed by roll molding, for example, steel plates, and has a cross section such that closed cross section portions 21, 22, which are vertically spaced apart, are connected to each other via a front portion 23. EA form F is attached in front of the bumper beam 20.

The bumper face 100 is an exterior part which is disposed to be exposed, outside the vehicle at the front end of the vehicle, and which is integrally formed with, for example, a resin based material such as PP. The bumper face 100 includes a main body 110 which is disposed in front of the bumper beam 20, and an air dam 120 which is disposed under the main body 110. An opening O for introducing an air stream into the radiator core and other parts is provided between the main body 110 and the air dam 120.

The main body 110 includes an upper surface 111, a front surface 112, and a lower surface 113. The upper surface 111 is disposed adjacent to the lower end of a grille (not illustrated) which is provided above the bumper face 100. The front surface 112 is disposed so as to extend downward from the front end of the upper surface 111. The lower surface 113 is disposed so as to extend rearward from the lower end of the front surface 112. The lower surface 113 forms the upper edge of the opening O.

The air dam 120 includes an upper surface 121, a front surface 122, and a lower surface 123. The upper surface 121 forms the lower edge of the opening O. The front surface 122 is formed so as to extend downward from the front end of the upper surface 121, and has a cross section which is curved so as to be convex at the front, the cross section being viewed from the side of the vehicle. The lower surface 123 is formed so as to extend rearward from the lower end of the front surface 122. The rear end of the lower surface 123 is fixed to a lower portion of a base 210 of the below-described EA bracket 200.

The inside of the opening O is provided with an opening cover 130 which has a louver for introducing an air stream. The upper end and the lower end of the opening cover 130 are respectively engaged with claws 113a, 121a which are provided at the rear end of the lower surface 113 of the main body 110 of the bumper face 100, and the rear end of the upper surface 121 of the air dam 120, respectively. In addition, at the lower end of the opening cover 130, a projecting portion 131 is formed which projects from below the upper surface 121 of the air dam 120 to a lower inclined position in a rear direction. The projecting tip (the rear end) of the projecting portion 131 is disposed so as to face and be spaced apart from the front face of an upper vehicle width direction rib 228 of the below-described EA bracket 200.

The EA bracket 200 is disposed rearward of the air dam 120 and in front of the radiator panel lower 10 so as to absorb energy received via the air dam 120 by deformation of the EA bracket 200 and to transmit a load to the radiator panel lower 10. The EA bracket 200 includes the base 210 and a curve deforming portion 220 which are integrally formed by injection molding, for example, a resin material such as PP.

The base 210 is a component which constitutes the rear portion of the EA bracket 200, and which is formed in a box shape by combining a plurality of vertical walls, side walls, and horizontal wall portions. For an example, the base 210 includes a first vertical wall 211, an upper surface 212, a lower surface 213, a second vertical wall 214, a horizontal wall portion 215, a third vertical wall 216, a mounting wall portion 217, and front-rear direction ribs 218.

The first vertical wall 211 is a plate-like component which constitutes the front surface of the base 210, and is formed so as to extend in a substantially vertical direction and the vehicle width direction. The upper surface 212 is a plate-like component which extends from the upper end of the first vertical wall 211 in a rear direction. The lower surface 213 is a plate-like component which extends from the lower end of the first vertical wall 211 in a rear direction. The lower surface 123 of the air dam 120 of the bumper face 100 is fixed to the lower surface 213, for example, by a resin fastener 213a. The rear end of the lower surface 213 is provided with a flange 213b which is formed so as to project upward.

The second vertical wall 214 is a plate-like component which extends downward from the rear end of the upper surface 212. The horizontal wall portion 215 is a plate-like component which is formed so as to project from the vertical center of the rear surface of the second vertical wall 214 in a rear direction of the vehicle. The third vertical wall 216 is a plate-like component which is disposed so as to be rearwardly spaced apart from and substantially in parallel to the second vertical wall 214. The rear end of the horizontal wall portion 215 is connected to the vertical center of the front surface of the third vertical wall 216.

The mounting wall portion 217 is a wall portion which extends from the vertical center of the rear surface of the third vertical wall 216 in a rear direction of the vehicle. The mounting wall portion 217 is disposed in such a manner that the upper surface thereof is aligned with the lower surface of the radiator panel lower 10, and is fixed to the radiator panel lower 10 by a fastener such as a bolt and nut (not illustrated). The first vertical wall 211, the upper surface 212, the lower surface 213, the second vertical wall 214, the horizontal wall portion 215, and the third vertical wall 216 described above are connected to each other by the front-rear direction ribs 218 which are disposed in a vertical direction and in a substantially front-rear direction of the vehicle. A plurality of the front-rear direction ribs 218 are disposed so as to be spaced apart in the vehicle width direction.

The curve deforming portion 220 is a component which is disposed in front of the base 210 to receive a load in a collision from the air dam 120 in a rear direction of the vehicle, so that the front end of the curve deforming portion 220 is deformed to bend downward. The curve deforming portion 220 includes an upper surface 221, a first lower vehicle width direction rib 222, a second lower vehicle width direction rib 223, a lower front-rear direction rib 224, a projecting surface 225, a triangular rib 226, an upper front-rear direction rib 227, and an upper vehicle width direction rib 228.

The upper surface 221 is a surface which is formed so as to project from the upper end vicinity of the front surface of the first vertical wall 211 of the base 210 in a forward direction of the vehicle. The upper surface 221 is formed so as to extend in the vehicle width direction and to have an inclined surface with a lower front side. The upper surface 221 has an arc-shaped (bow-shaped) cross section with an upward convex as viewed in the vehicle width direction. The inclination (slope) at a position of the upper surface 221 in the front-rear direction of the vehicle is nearly zero in the vicinity of the connection point between the base 210 and the upper surface 221, and continuously increases as the position is closer to the front end of the upper surface 221.

The first lower vehicle width direction rib 222 and the second lower vehicle width direction rib 223 are plate-like components which are formed so as to project downward from the upper surface 221 and to extend substantially in the vehicle width direction, and are disposed successively from the front side of the vehicle. The lower front-rear direction rib 224 is a plate-like member which is formed so as to project downward from the upper surface 221 and to extend in a substantially front-rear direction. The lower front-rear direction rib 224 connects between the first lower vehicle width direction rib 222 and the second lower vehicle width direction rib 223, and between the second lower vehicle width direction rib 223 and the first vertical wall 211 of the base 210. The lower end of the lower front-rear direction rib 224 is provided with a notch 224a which is formed by denting up itself immediately in front of the second lower vehicle width direction rib 223 and the first vertical wall 211 so as not to prevent deformation of the upper surface 221 at the time of a collision.

The projecting surface 225 is a plate-like component which is formed in a flange shape so as to stand upright from the front end of the upper surface 221. The triangular rib 226 is a triangular gusset-shaped reinforcing member which is provided between the rear side of the projecting surface 225 and an area adjacent to the projecting surface 225 of the upper surface 221.

The upper front-rear direction rib 227 is a plate-like member which is formed so as to project upward from the upper surface 221 and to extend in a substantially front-rear direction. The front end of the upper front-rear direction rib 227 is disposed adjacent to the rear end of the triangular rib 226. The projection height of the upper front-rear direction rib 227 over the entire length from the upper surface 221 is set to be a substantially constant value. The upper end of the upper front-rear direction rib 227 has an arc-shaped cross section with an upward convex as viewed in the vehicle width direction. The upper end of the upper front-rear direction rib 227 at the rear end thereof is disposed so as to have substantially the same height as that of the upper surface 212 of the base 210. A plurality of the upper end of the upper fore-and-aft direction ribs 227 are provided in a dispersed manner in front-rear the vehicle width direction.

The upper vehicle width direction rib 228 is a plate-like component which is formed so as to project upward from approximately the center (for example, immediately rear the second lower vehicle width direction rib 223) of the upper surface 221 in the front-rear direction. The height of an upper end of the upper vehicle width direction rib 228 is set to be substantially the same as the height of the upper end of the upper front-rear direction rib 227 in the vicinity of the upper vehicle width direction rib 228.

The configuration of the above-described surfaces and ribs is only an example, and may be changed as appropriately. The flexural rigidity of the base 210 of the EA bracket 200 against a load applied in a vertical direction is set to be sufficiently large relative to the flexural rigidity of the curve deforming portion 220 in order to stabilize the deformation mode of the curve deforming portion 220. Setting of such a flexural rigidity may be adjusted in any manner according to the configuration and the thickness of the surfaces included in the base 210 and the curve deforming portion 220, and whether or not reinforcement is provided.

Figure 2B:
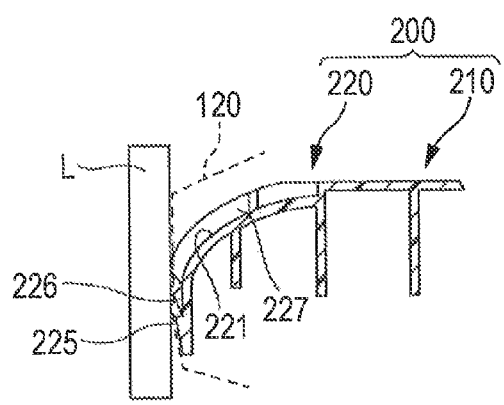
Figure 2C:
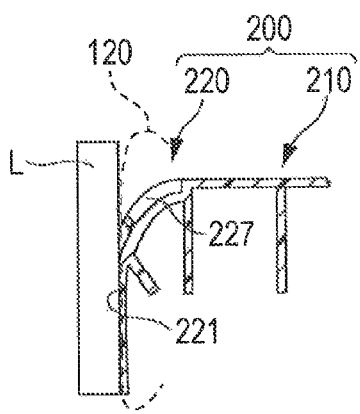

Hereinafter, the effect of the above embodiment will be described. FIGS. 2A to 2C are time series schematic diagrams illustrating the behavior of the vehicle front structure in Embodiment 1 when a collision with a leg of a pedestrian occurs. FIG. 2A illustrates the state of the vehicle front structure before the collision; FIG. 2B illustrates the state during deformation of the EA bracket due to the collision; and FIG. 2C illustrates the state after the deformation of the EA bracket due to the collision. When a pedestrian's leg L approaches the front of the vehicle and collides with the air dam 120 as illustrated in FIG. 2A, the air dam 120 is deformed, so that the projecting surface 225 of the EA bracket 200 is pushed toward the rear of the vehicle as illustrated in FIG. 2B. Thus, a bending moment for lowering the end of the curve deforming portion 220 of the EA bracket 200 is generated, so that the upper surface 221 is deformed so as to increase the curvature of the bending, and the end of the curve deforming portion 220 is displaced downward to slide down along the inner surface of the air dam 120.

Subsequently, when the amount of rearward displacement of the air dam 120 further increases as illustrated in FIG. 2C, the amount of deformation of the curve deforming portion 220 further increases while the projecting tip of the upper front-rear direction rib 227 is sliding on the inner surface of the air dam 120. Consequently, the curve deforming portion 220 receives the load from the pedestrian's leg L in a range which is wide in the vertical direction and has a lower end lower the position of the projecting surface 225 before the collision. In the state illustrates in FIG. 2C, the projecting surface 225, the triangular rib 226, and the first half of the upper front-rear direction rib 227 are already crushed. This allows a lower portion of the pedestrian's leg L to be hit away and prevents local concentration of load to reduce the degree of damage to the pedestrian.

Figure 3:
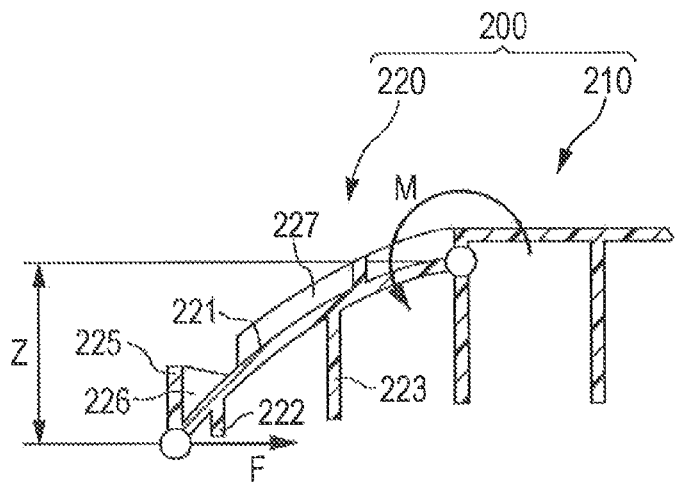
FIG. 3 illustrates a relationship between the height of the end of a curve deforming portion of EA bracket and a moment around the connection point with the base of the upper surface of the EA bracket in the vehicle front structure in Embodiment 1.

FIG. 3 illustrates a relationship between the height setting of the end of the EA bracket and the moment around the connection point with the base of the upper surface. As illustrated in FIG. 3, a moment M which is applied to the rear end (the vicinity of the connection point with the base 210) of the upper surface 221 of the curve deforming portion 220 increases in relation to a height difference Z between the front end and the rear end of the upper surface 221, the front end being an input point of a load F. Therefore, for setting the shape and dimension of the EA bracket 200, it is preferable to increase the height difference Z between the front end and the rear end of the upper surface 221 as much as possible within a range of restrictions on the design of the vehicle and the internal structure of the air dam.

Figure 4A:
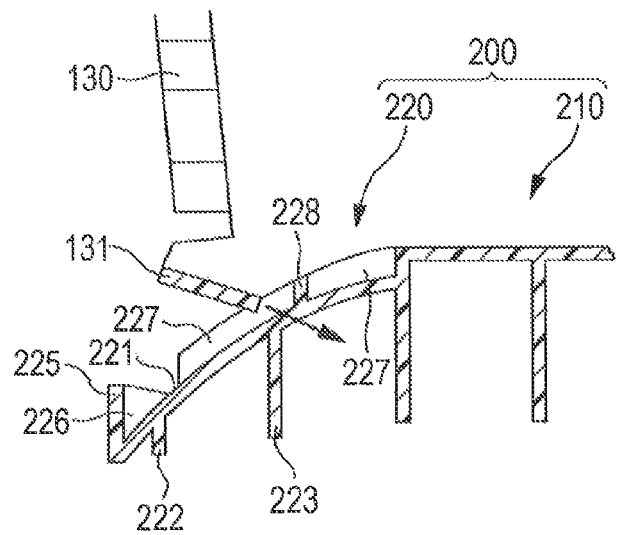
FIGS. 4A and 4B are schematic diagrams illustrating the function of a projecting portion of an opening cover and an upper vehicle width direction rib of the EA bracket in the vehicle front structure in Embodiment 1.
Figure 4B:
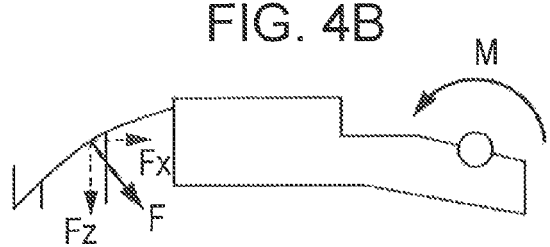

FIGS. 4A and 4B are schematic diagrams illustrating the function of the projecting portion of the opening cover and the upper vehicle width direction rib of the EA bracket. When the projecting tip (the rear end) of the projecting portion 131 (as an engaging projection) is collided with the upper vehicle width direction rib 228 (as an engaged portion) of the EA bracket 200 as illustrated in FIG. 4A, the load F is applied to the curve deforming portion 220 of the EA bracket to a lower inclined position in a rear direction as illustrated in FIG. 4B. Here, when the fore-and-aft component of the load F is assumed to be Fx, and the vertical component of the load F is assumed to be Fz, it is found that the vertical component Fz prevents the central portion of the upper surface 221 from being deformed upward, the upper surface 221 having been received pressure from the front, while generating a moment in a direction for lowering the front end of the EA bracket 200 around the mounting portion for the radiator panel lower 10. Consequently, upward deformation of the central portion of the EA bracket 200 is prevented, and the deformation mode of the curve deforming portion 220 can be stabilized.

Figure 5A:
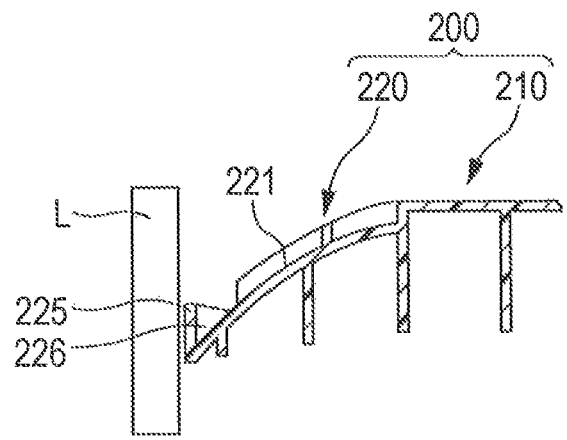
FIGS. 5A and 5B are schematic diagrams illustrating the effect of a projecting surface of the end of the EA bracket in the vehicle front structure in Embodiment 1.
Figure 5B:
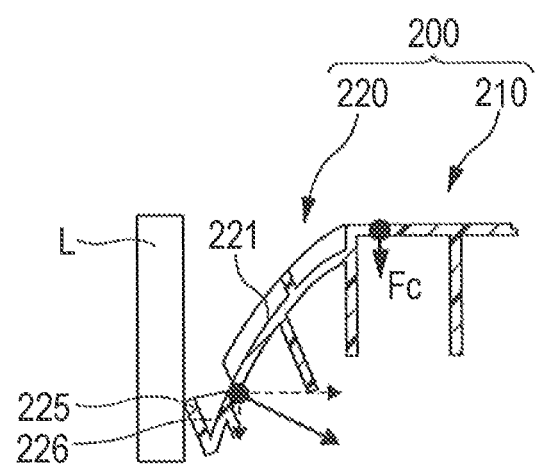

FIGS. 5A and 5B are schematic diagrams illustrating the effect of the projecting surface of the EA bracket. FIGS. 5A and 5B illustrate the state before the collision and the state after the collision, respectively. When curve deformation of the upper surface 221 starts after the collision and the projecting surface 225 is inclined forward, so that the upper end of the projecting surface 225 is displaced forwardly of the lower end thereof as illustrated in FIG. 5B, a force Fc for depressing the central portion of the EA bracket is generated by a load applied from the pedestrian's leg L, the load pushing against the upper end of the projecting surface 225 downward. Consequently, upward deformation of the central portion of the EA bracket 200 is prevented, and the deformation mode of the curve deforming portion 220 can be further stabilized.

As described above, the following effects can be obtained by the vehicle front structure according to Embodiment 1.

(1) The upper surface 221 of the curve deforming portion 220 of the EA bracket 200 has an arc-shaped cross section with an upward convex as viewed in the vehicle width direction. In addition, the EA bracket 200 is inclinedly disposed, so that the front end thereof is lower than the rear end thereof. A compressive load received from the front of the vehicle at the time of a collision causes the upper surface 221 to be deformed so as to increase the curvature thereof, and thus the deformation mode, in which the front end is lowered, can be stably obtained. Moreover, entire deformation rather than local deformation of the upper surface 221 can prevent a local damage which is caused by troublesome concentrated stress generated when using a technology of bending an energy absorbing bracket, for example, at a predetermined bending position. Thus, a load from the pedestrian's leg L can be received at a position lower than the front end position of the EA bracket 200 before the collision, thereby allowing a lower portion of the pedestrian's leg L to be hit away to reduce the degree of damage to the pedestrian. Furthermore, in the second half of the collision in which deformation stroke of the EA bracket 200 increases, the upper surface 221 is bent, so that the front end slides down to be deformed so as to face the rear of the air dam 120 of the bumper face 100, thereby being capable of receiving the load in a wide range in the vertical direction.

(2) The upper front-rear direction rib 227, which projects upward from the upper surface 221, is provided, and thus the air dam 120 is displaced rearward at the time of a collision, and when the upper portion of the EA bracket 200 slides relative to the air dam 120, the contact portion therebetween is substantially a line contact, so that the contact area is reduced, and a frictional force generated therebetween is reduced. The deformation mode in a direction, in which the end portion of the EA bracket 200 is lowered, can be stabilized.

(3) A configuration is adopted in which the projecting portion 131 provided in the bumper face 120 pushes against the upper vehicle width direction rib 228 of the EA bracket 200 at the time of a collision, and thus a moment in a direction for lowering the central portion of the EA bracket 200 around the mounting portion for the radiator panel lower 10 can be generated to prevent upward deformation of the central portion of the EA bracket 200, and the deformation mode can be further stabilized. In addition, load transmission from the air dam 120 to the EA bracket 200 can be performed via the projecting portion 131 and the upper vehicle width direction rib 228, and thus the energy absorbing effect can be further enhanced.

(4) The projecting surface 225, which projects upward from the end of the upper surface 221 of the EA bracket 200, is provided, and thus a moment for lowering the center portion of the EA bracket 200 is generated at the time of a collision to prevent upward deformation of the center portion, and the deformation mode can be further stabilized.

(5) The triangular rib 226 is provided between the rear surface of the projecting surface 225 and the upper surface 211, thereby reliably obtaining the effect in the above statement (4).

(6) The flexural rigidity of the base 210 of the EA bracket 200 is set to be higher than the flexural rigidity of the curve deforming portion 220, and thus the deformation mode of the curve deforming portion 220 can be further stabilized.

(7) The lower front-rear direction rib 224 of the EA bracket 200 is provided with a notch 224a, and thus the lower front-rear direction rib 224 does not prevent curve deformation of the upper surface 221 and the above-described effect can be reliably obtained. It is to be noted that the size, shape, position, and presence of such a notch may be changed as appropriately in order to adjust the performance.

Embodiment 2

Hereafter, a vehicle front structure according to Embodiment 2 in the present invention will be described. Substantially the same components as those described in Embodiment 1 are labeled with the same reference symbols, and description thereof is omitted, however, the point of difference will be mainly described. FIG. 6 is a cross-sectional view of the vehicle front structure according to Embodiment 2, the view being taken at the center in the vehicle width direction. The vehicle front structure in Embodiment 2 has essentially the same configuration as that of Embodiment 1 except that the projecting portion 131 of the opening cover 130 and the upper vehicle width direction rib 228 of the EA bracket 200 in Embodiment 1 are omitted. In also the above-described Embodiment 2, essentially the same effect as that of Embodiment 1 can be obtained except the effect specific to the projecting portion 131 and the upper vehicle width direction rib 228 described above.

[Modification]

The present invention may be modified or changed in various manners without being limited to the above-described embodiments, and the modifications are also within a technical scope of the present invention. The shape, structure, material quality, manufacturing method, and arrangement of the members are not limited to the above-described embodiments, and may be changed as appropriately. For example, the upper surface of the curve deforming portion of the EA bracket has a slope which continuously increases over a range from the rear of the vehicle to the front of the vehicle in the embodiments, however, the slope may increases stepwise instead. For example, a plurality of bending portions which are arranged at the center portion of the upper surface in the front-rear direction may be provided so as to have successive steeper slopes. The configuration, arrangement, and shape of the ribs and the surfaces of the EA bracket in the embodiments are just examples, and may be changed as appropriately. In Embodiment 1, the projecting portion is provided in the opening cover. However, without being limited to this, the projecting portion may be provided integrally with or separately from the bumper face or other exterior members.

What is claimed is:

1. A vehicle front structure comprising:
   an exterior member provided at a lower portion of a front end of a vehicle; and
   an energy absorbing bracket having a front end and a rear end, the front end facing a rear surface of the exterior member and the rear end being mounted on a vehicle structural member,
   wherein the energy absorbing bracket has
      an upper surface which is disposed so as to be inclined downward toward a front side of the vehicle, with an inclination that increases continuously or stepwise from a rear side of the vehicle to the front side of the vehicle, the upper surface having an arc-shaped cross section with an upward convex as viewed in the vehicle width direction,
      a lower vehicle width direction rib which is formed so as to project downward from the upper surface and extends substantially in a vehicle width direction, and
      a lower vehicle front-rear direction rib which is formed so as to project downward from the upper surface and extends substantially in a vehicle front-rear direction, the downward length of the lower vehicle front-rear direction rib being gradually shortened from a rear side of the vehicle to the front side of the vehicle.

2. The vehicle front structure according to claim 1, further comprising
   an upper vehicle front-rear direction rib projecting upward from the upper surface, extending substantially in the vehicle front-rear direction, and having an arc-shaped cross section with an upward convex as viewed in the vehicle width direction,
   wherein an end of the upper vehicle front-rear direction rib is disposed so as to slide along a portion of the exterior member in the event of a collision.

3. The vehicle front structure according to claim 2, further comprising
   a projecting surface formed so as to project upward from a front end of the upper surface.

4. The vehicle front structure according to claim 3, further comprising
   a gusset-shaped reinforcing member formed between a rear surface of the projecting surface and the upper surface.

5. The vehicle front structure according to claim 1, further comprising:
   an engaging projection projecting from the exterior member toward the energy absorbing bracket; and
   an engaged portion formed so as to project from the upper surface of the energy absorbing bracket, and disposed to face a projecting tip of the engaging projection.

6. The vehicle front structure according to claim 5, further comprising
   a projecting surface formed so as to project upward from a front end of the upper surface.

7. The vehicle front structure according to claim 6, further comprising
   a gusset-shaped reinforcing member formed between a rear surface of the projecting surface and the upper surface.

8. The vehicle front structure according to claim 1, further comprising
   a projecting surface formed so as to project upward from a front end of the upper surface.

9. The vehicle front structure according to claim 8, further comprising
   a gusset-shaped reinforcing member formed between a rear surface of the projecting surface and the upper surface.

10. The vehicle front structure according to claim 1,
    wherein a flexural rigidity against a load applied in a vertical direction in an area located rearward of another area in which the upper surface of the energy absorbing bracket is inclined is higher than a flexural rigidity in the another area.

11. The vehicle front structure according to claim 1,
    wherein a notch is formed in a lower end of the lower vehicle front-rear direction rib.

12. A vehicle front structure comprising:
    an exterior member provided at a lower portion of a front end of a vehicle; and
    an energy absorbing bracket having a front end and a rear end, the front end facing a rear surface of the exterior member and the rear end being mounted on a vehicle structural member,
    wherein the energy absorbing bracket has
       an upper surface which is disposed so as to be inclined downward toward a front side of the vehicle, with an inclination that increases continuously or stepwise from a rear side of the vehicle to the front side of the vehicle,
       a lower vehicle width direction rib which is formed so as to project downward from the upper surface and extends substantially in a vehicle width direction, and
       a lower vehicle front-rear direction rib which is formed so as to project downward from the upper surface and extends substantially in a vehicle front-rear direction,
       an upper vehicle front-rear direction rib projecting upward from the upper surface and extends substantially in the vehicle front-rear direction, wherein an end of the upper vehicle front-rear direction rib is disposed so as to slide along a portion of the exterior member in the event of a collision.

13. The vehicle front structure according to claim 12, further comprising
    a projecting surface formed so as to project upward from a front end of the upper surface.

14. The vehicle front structure according to claim 13, further comprising
    a gusset-shaped reinforcing member formed between a rear surface of the projecting surface and the upper surface.

15. A vehicle front structure comprising:
    an exterior member provided at a lower portion of a front end of a vehicle;
    an energy absorbing bracket having a front end and a rear end, the front end facing a rear surface of the exterior member and the rear end being mounted on a vehicle structural member,
    wherein the energy absorbing bracket has
       an upper surface which is disposed so as to be inclined downward toward a front side of the vehicle, with an inclination that increases continuously or stepwise from a rear side of the vehicle to the front side of the vehicle, a lower vehicle width direction rib which is formed so as to project downward from the upper surface and extends substantially in a vehicle width direction, a lower vehicle front-rear direction rib which is formed so as to project downward from the upper surface and extends substantially in a vehicle front-rear direction, a projecting surface formed so as to project upward from a front end of the upper surface, and a gusset-shaped reinforcing member formed between a rear surface of the projecting surface and the upper surface.

16. The vehicle front structure according to claim 15, further comprising
an upper vehicle front-rear direction rib projecting upward from the upper surface and extending substantially in the vehicle front-rear direction.

17. The vehicle front structure according to claim 15, further comprising
an engaging projection projecting from the exterior member toward the energy absorbing bracket; and
an engaged portion formed so as to project from the upper surface of the energy absorbing bracket, and disposed to face a projecting tip of the engaging projection.

* * * * *